US008364587B2

(12) United States Patent
Nuzum et al.

(10) Patent No.: US 8,364,587 B2
(45) Date of Patent: Jan. 29, 2013

(54) SYSTEMS AND METHODS FOR FINANCIAL ACCOUNT ACCESS FOR A MOBILE DEVICE VIA A GATEWAY

(75) Inventors: Todd R Nuzum, Omaha, NE (US);
Barbara C Gaines, Omaha, NE (US);
Brent D Adkisson, Omaha, NE (US);
Vijay K Royyuru, Norristown, PA (US)

(73) Assignee: First Data Corporation, Greenwood Village, CO (US)

( * ) Notice: Subject to any disclaimer, the term of this patent is extended or adjusted under 35 U.S.C. 154(b) by 915 days.

(21) Appl. No.: 12/361,309

(22) Filed: Jan. 28, 2009

(65) Prior Publication Data

US 2010/0191633 A1    Jul. 29, 2010

(51) Int. Cl.
*G06Q 40/00*    (2012.01)
(52) U.S. Cl. ............................................. 705/39; 705/35
(58) Field of Classification Search .................... 705/39, 705/35
See application file for complete search history.

(56) References Cited

U.S. PATENT DOCUMENTS

| 6,836,765 | B1 | 12/2004 | Sussman |
| 7,162,454 | B1 | 1/2007 | Donner et al. |
| 7,689,508 | B2 * | 3/2010 | Davis et al. ................... 705/39 |
| 2004/0181448 | A1 | 9/2004 | Hartsman et al. |
| 2004/0230536 | A1 | 11/2004 | Fung et al. |
| 2005/0187873 | A1 * | 8/2005 | Labrou et al. ................... 705/40 |
| 2005/0234822 | A1 | 10/2005 | VanFleet et al. |
| 2005/0256802 | A1 | 11/2005 | Ammermann et al. |
| 2006/0165060 | A1 | 7/2006 | Dua |
| 2006/0212355 | A1 | 9/2006 | Teague et al. |
| 2006/0253390 | A1 | 11/2006 | McCarthy et al. |
| 2007/0095892 | A1 * | 5/2007 | Lyons et al. ................... 235/379 |
| 2007/0260558 | A1 * | 11/2007 | Look ................................. 705/76 |
| 2008/0207203 | A1 | 8/2008 | Arthur et al. |
| 2008/0207234 | A1 | 8/2008 | Arthur et al. |
| 2008/0208742 | A1 | 8/2008 | Arthur et al. |
| 2008/0208743 | A1 * | 8/2008 | Arthur et al. ................... 705/41 |
| 2008/0208744 | A1 | 8/2008 | Arthur et al. |

(Continued)

FOREIGN PATENT DOCUMENTS

| EP | 1467300 A1 | 10/2001 |
| WO | 2005079254 A2 | 9/2005 |

(Continued)

OTHER PUBLICATIONS

Kwok et al., "Digital Rights Management for Mobile Commerce Using Web Services." Journal of Electronic Commerce Research. vol. 7, No. 1, 2006, entire document.

(Continued)

*Primary Examiner* — Jagdish Patel
*Assistant Examiner* — Kevin Poe
(74) *Attorney, Agent, or Firm* — Sutherland Asbill & Brennan LLP

(57) ABSTRACT

Systems and methods for providing secure access of at least one of multiple financial account processors to a mobile device and/or facilitating secure financial transactions initiated from a mobile device via a gateway. One method can include receiving a mobile personal identification number (M-PIN) number and Customer Unique Identifier (CUID) from a mobile device and processing the received M-PIN and CUID to identify a Mobile Unique Identifier (MUID). The MUID identifies an account of at least one financial account processor accessible via a gateway, and the mobile device is provided access to the account through the gateway.

20 Claims, 5 Drawing Sheets

U.S. PATENT DOCUMENTS

2008/0208762 A1 8/2008 Arthur et al.
2008/0255947 A1 10/2008 Friedman
2008/0319887 A1* 12/2008 Pizzi et al. .................... 705/35
2009/0132415 A1* 5/2009 Davis et al. .................... 705/43
2010/0145835 A1* 6/2010 Davis et al. .................... 705/30

FOREIGN PATENT DOCUMENTS

| | | | |
|---|---|---|---|
| WO | 2008103871 | A1 | 8/2008 |
| WO | 2008103875 | A1 | 8/2008 |
| WO | 2008103879 | A2 | 8/2008 |
| WO | 2008103880 | A2 | 8/2008 |
| WO | 2008103882 | A2 | 8/2008 |
| WO | 2008103883 | A1 | 8/2008 |
| WO | 2008112402 | A1 | 9/2008 |
| WO | 2008127967 | A2 | 10/2008 |

OTHER PUBLICATIONS

International Search Report and Written Opinion mailed Nov. 7, 2008 for PCT/US2008/054654.
International Search Report and Written Opinion mailed Jun. 27, 2008 for PCT/US2008/054676.
International Search Report and Written Opinion mailed Jul. 22, 2008 for PCT/US2008/054672.
International Search Report and Written Opinion mailed Jun. 20, 2008 for PCT/US2008/054673.
International Search Report and Written Opinion mailed Jun. 19, 2008 for PCT/US2008/054664.
International Search Report and Written Opinion mailed Jul. 17, 2008 for PCT/US2008/054670.
International Search Report and Written Opinion mailed May 6, 2008 for PCT/US2008/054679.

* cited by examiner

SYSTEMS AND METHODS FOR FINANCIAL ACCOUNT ACCESS FOR A MOBILE DEVICE VIA A GATEWAY

FIELD OF THE INVENTION

Embodiments of the invention relate generally to financial transactions, and more particularly to systems and methods for financial account access for a mobile device via a gateway.

BACKGROUND OF THE INVENTION

Mobile devices such as cell phones, personal digital assistants (PDAs) and other similar devices have increasingly been used for the transfer of data both wireless access protocol (WAP) enabled and Internet protocol. While online purchasing and bank are available via these devices, potential security issues remain with extensive use of mobile devices to initiate financial transactions. Monitoring devices such as "sniffers" and other devices may be used to intercept signals from mobile devices to obtain information from these signals, which may include private financial information such as account numbers, personal identification numbers (PINs), and the like. As a result, the use of mobile devices to initiate financial transactions is subject to various risks.

There is the additional risk of lost or stolen mobile devices that may have financial information stored on the device that would be accessible by the thief or person who found the phone causing concern similar to when an individual loses a wallet, credit card, ID, etc. What is needed is a secure way to initiate or otherwise participate in financial transaction using a mobile device.

BRIEF DESCRIPTION OF THE INVENTION

According to an embodiment of the invention, there is disclosed a method for providing secure access of at least one of multiple financial account processors to a mobile device and/or facilitating secure financial transactions initiated from a mobile device via a gateway. The method may include receiving a mobile personal identification number (M-PIN) and Customer Unique Identifier (CUID) from a mobile device, and processing the received M-PIN and CUID to identify a Mobile Unique Identifier (MUID), where the MUID identifies an account of at least one financial account processor accessible via a gateway. The method further includes providing the mobile device with access to the account of at least one financial account processor through the gateway. In accordance with one aspect of the invention, prior to providing the mobile device with access to the account, the method further includes determining a set of inquiries (e.g., security challenge questions) associated with at least one financial account processor to be presented to the mobile device, transmitting the set of inquiries to the mobile device, receiving response information from the mobile device to answer the set of inquires, and verifying the response information where the mobile device is provided with access to at least one financial account processor only after the response information is verified.

According to another aspect of the invention, prior to receiving the M-PIN and the CUID, the method further includes an enrollment process where enrollment information is received at the gateway. The enrollment information may include a financial account number associated with at least one of the financial account processors accessible through a gateway processor and the M-PIN, where the M-PIN is associated with the financial account number. The enrollment process further includes assigning the CUID to a mobile device associated with the M-PIN, creating a MUID based at least in part on the CUID and PIN and storing the MUID. The MUID is associated with the enrollment information. In accordance with yet another aspect of the invention, the method further includes transmitting the CUID to the mobile device during the enrollment process. According to another aspect of the invention, the enrollment process further includes assigning an activation code to the CUID, and transmitting the activation code to the mobile device. In accordance with yet another aspect of the invention, transmitting the activation code to the mobile device comprises transmitting the activation code to the mobile device via short message service (SMS) text messaging.

According to another aspect of the invention, processing the received M-PIN and CUID to identify a MUID may include identifying a plurality of MUIDs associated with the mobile device, receiving the M-PIN and the CUID may include receiving an indicator associated with at least one financial account processor associated with one of the plurality of MUIDs, and providing the mobile device with access to at least one financial account processor may include providing the mobile device with access to at least one financial account processor associated with the indicator. In accordance with yet another aspect of the invention, at least one financial account processor is a debit DDA processor, credit card processor, or pre-paid processor. According to another aspect of the invention, the method further includes receiving request data from a mobile device, translating the request data into a format acceptable to at least one financial account processor, and transmitting the translated request data to at least one financial account processor. In accordance with yet another aspect of the invention, the request data includes a payment instruction.

In accordance with another embodiment of the invention, there is disclosed a system for providing secure access of at least one of multiple financial account processors to a mobile device and/or facilitating secure financial transactions initiated from a mobile device via a gateway. The system may include a memory for storing computer-executable instructions, and a processor in communication with the memory. The processor is configured to execute the computer-executable instructions to receive a mobile personal identification number (M-PIN) and Customer Unique Identifier (CUID) from a mobile device, and process the received M-PIN and CUID to identify a Mobile Unique Identifier (MUID), which identifies an account of at least one financial account processor. The processor is further configured to execute the computer-executable instructions to provide the mobile device with access to the account of at least one financial account processor. According to one aspect of the invention, prior to providing the mobile device with access to the account based on the review of the response information, the processor is further configured to execute the computer-executable instructions to determine a set of inquiries associated with at least one financial account processor, and transmit the set of inquiries to the mobile device. The processor is further configured to execute the computer-executable instructions to receive response information from the mobile device to answer the set of inquires, and verify the response information, where the mobile device is provided with access to at least one financial account processor after the response information is verified.

In accordance with another aspect of the invention, prior to receiving the M-PIN and the CUID from the mobile device, the processor is further configured to execute the computer-executable instructions to receive enrollment information.

The enrollment information includes a financial account number associated with at least one financial account processor accessible through a gateway processor and the M-PIN associated with the financial account number. The processor is further configured to execute the computer-executable instructions to assign a CUID to a mobile device associated with the M-PIN, create a MUID based at least in part on the CUID and M-PIN, and store the MUID in the memory. The MUID is associated with the enrollment information. According to yet another aspect of the invention, the processor is further configured to execute the computer-executable instructions to transmit the CUID to the mobile device. In accordance with another aspect of the invention, the processor is further configured to execute the computer-executable instructions to assign an activation code to the CUID, and transmit the activation code to the mobile device. According to yet another aspect of the invention, the computer-executable instructions to transmit the activation code to the mobile device include transmitting the activation code to the mobile device via short message service (SMS) text messaging.

In accordance with another aspect of the invention, the computer-executable instructions to process the received M-PIN and CUID to identify a MUID include identifying a plurality of MUIDs associated with the mobile device. Moreover, the computer-executable instructions to receive the M-PIN and the CUID may include receiving an indicator associated with at least one financial account processor associated with one of the plurality of MUIDs from the mobile device. Further, the computer-executable instructions to provide the mobile device with access to at least one financial account processor may include providing the mobile device with access to at least one financial account processor associated with the indicator. According to yet another aspect of the invention, at least one financial account processor is a debit DDA processor, credit card processor, or pre-paid processor. In accordance with another aspect of the invention, the processor is further configured to execute the computer-executable instructions to receive request data from the mobile device, translate the request data into a format acceptable to at least one financial account processor, and transmit the translated request data to at least one financial account processor. According to yet another aspect of the invention, the request data includes a payment instruction.

DETAILED DESCRIPTION OF EMBODIMENTS OF THE INVENTION

Certain embodiments of the invention are directed to providing secure access of at least one of multiple financial account processors to a mobile device and/or facilitating secure financial transactions initiated from a mobile device via a gateway. According to an example embodiment of the invention, there is disclosed a method for providing secure financial transactions initiated by a mobile device that include receiving a mobile personal identification number (M-PIN) number and Customer Unique Identifier (CUID) information from a mobile device, and processing the received M-PIN number and CUID to identify a Mobile Unique Identifier (MUID), where the MUID is associated with or identifies an account of one of a plurality of financial account processors. The CUID is associated with or represents the mobile device itself, and the M-PIN is associated with or represents a user of the mobile device attempting to utilize or otherwise access an account, such as a financial account. Once authenticated, the mobile device is provided access to and/or use of a financial account associated with at least one of the financial account processors. The systems and methods described herein provide both a common interface protocol for a mobile device to access and/or use various financial account processors operating on various platforms as well as provide a secure way to access and/or utilize associated accounts in a multitude of financial transactions.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
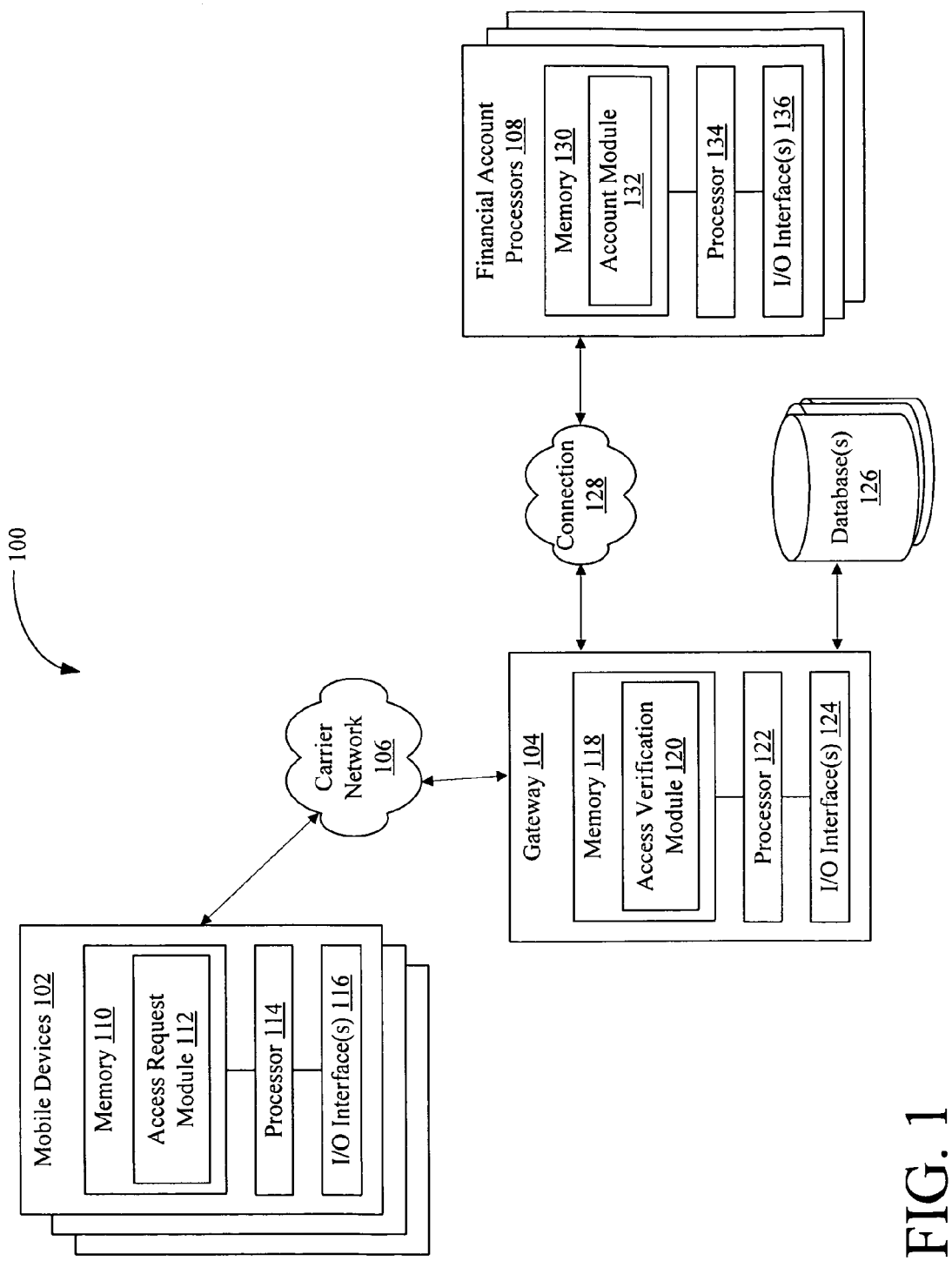
FIG. 1 shows an example system for providing secure access to one of multiple financial account processors via a mobile device in accordance with one embodiment of the invention.

FIG. 1 shows an example system 100 for providing secure access to one of multiple financial account processors via a mobile device in accordance with one embodiment of the invention. As shown in FIG. 1, the system 100 for providing secure access to one of multiple financial account processors 108 via a mobile device 102 includes at least one mobile device 102, a gateway 106, and one or more financial account processors 108 (e.g., prepaid, postpaid, debit, credit, DEA, loyalty, and/or private label processing platforms, and/or private credit card, merchant, or bank systems, and the like). Each mobile device 102, gateway 104, and/or financial account processor 108, may be configured for accessing and reading associated computer-readable media having stored thereon data and/or computer-executable instructions for implementing any of the various methods in accordance with example embodiments of the invention.

Generally, network devices and systems, including one or more mobile devices 102, gateways 104, and financial account processors 108 have hardware and/or software for transmitting and receiving data and/or computer-executable instructions over a communications link and a memory for storing data and/or computer-executable instructions. These network devices and systems may also include a processor for processing data and executing computer-executable instructions, as well as other internal and peripheral components. In an example embodiment of the invention, the system may be supported by redundant software, communications links, and uninterruptible power supplies, thereby ensuring that all connections will provide reliable, continuous operation. The system 100 also ensures that the data transmitted to and from the mobile devices 102, gateway 104, and/or financial account processors 108 are routed relatively quickly, accurately, and consistently.

The mobile device 102 may comprise any mobile processor-driven device, such as a mobile phone, radio, pager, laptop computer, handheld computer, PDA, and the like. The mobile device 102 may include a memory 110, input/output ("I/O") interface(s) 116 and a processor. The memory 110 may store data files and various program modules, such as an operating system ("OS") and an access request module 112. The access request module 112 may include an Internet browser or other software, including a dedicated program, for interacting with the gateway 104 via a web portal accessible through the browser or via other communication means. For example, a user of a mobile device 102 may utilize the access request module 112 to communicate with the gateway 104. The access request module 112 may also be able to communicate with one or more financial account processors 108.

Still referring to the mobile device 102, the I/O interface(s) 116 may facilitate communication between the processor 114 and a user of the mobile device 102 and/or other input/output devices in communication with the mobile device 102. The I/O interfaces 116 may include, for example, a display, button(s), touchpad, keyboard, stylus, microphone, speaker, touch screen display, bar code readers/scanners, RFID readers, network interface card, a modem, a wireless network card and the like. The I/O interfaces 116 may also facilitate connection of the mobile device 102 to one or more suitable networks such as the carrier network 106, a local area network, a wide area network, the Internet, an intranet, a telephone network, a cellular network, and the like. Other components for a mobile device 102 can exist in other embodiments of the invention.

In the example embodiment of FIG. 1, the mobile device 102 and gateway 104 may be in communication with each other via carrier network 106. In example embodiments of the invention, the connection between the mobile device 102 and the gateway may be an http connection, socket connection, WAP-enabled connection, a Simple Object Access Protocol (SOAP) connection, or the like. The carrier network 106 may comprise one or more networks that may include any telecommunication and/or data network, whether public, private, or a combination thereof, including a public switched telephone network (PSTN), a cellular network, a local area network, a wide area network, an intranet, an internet, the Internet, intermediate hand-held data transfer devices, and/or any combination thereof and may be wired and/or wireless. In an example embodiment of the invention, the carrier network 106 may be the same network as connection 128 discussed in further detail below, or alternatively, the carrier network 106 may be in communication with connection 128.

The gateway 104 may create a common interface for a mobile device, such as mobile device 102, attempting to access one or more financial account processors 108 and may also facilitate response messages from the financial account processors 108 to the mobile device 102. The gateway 104 may include at least one processor 122, a memory 118, and one or more input/output ("I/O") interface(s) 124. In an example embodiment of the invention, the gateway 104 may be a server or other computing device. In an example embodiment of the invention, the memory 118 may include an operating system ("OS"), such as, but not limited to, Microsoft Windows®, Apple OSX™, Unix, or Linux, and a database management system ("DBMS") to facilitate management of data files and data stored in the memory 118. The memory 118 may also store data files and various software program modules, such as an access verification module 120 for processing any number of transactions initiated by a mobile device 102 requesting access to a financial account associated with a financial account processor 108 and/or processing messages received from one or more financial account processors 108.

As shown in FIG. 1, the access verification 120 may be incorporated into the gateway 104, or alternatively, the access verification module 120 may be in communication with, but separate from, the gateway 104. The access verification module 120 may additionally operate in conjunction with one or more of the I/O interfaces 124 to facilitate communication with one or more other components of the system 100, such as, one or more financial account processors 108, which may include payment processors, an issuer, a bank, and the like, and/or with the database 126 or one or more third party data sources. The I/O interfaces 124 may also facilitate communication with the gateway 104 and may include, for example, a display, keyboard, keypad, mouse, control panel, touch screen display, microphone, and the like, that facilitate user interaction with the gateway 104. The I/O interfaces 124 may also facilitate connection of the gateway 104 to one or more suitable networks such as the carrier network 106, a local area network, a wide area network, the Internet, an intranet, a telephone network, a cellular network, and the like. Additionally, other components may be included in the gateway 104 as desired in various embodiments of the invention.

As described herein, the gateway 104 may comprise computer-executable instructions for implementing one or more methods described herein, including processing, authenticating, translating and/or routing messages received from the mobile devices 102 and/or the financial account processors 108. The gateway 104 may likewise be operative to store various transaction data, customized user interfaces associated with various financial account processors 108, inquiries (e.g., security challenge questions) associated with one or more financial account processors, and the like in database(s) 126, which may include a distinct database and/or a database shared with one or more of the financial account processors 108. In an example embodiment of the invention, the database(s) 126 in communication with the gateway 104 may include additional data to facilitate processing, authenticating, translating and/or routing various messages received from the mobile device 102 and/or the financial account processors 108.

In an example embodiment of the invention, the gateway 104 provides the web portal functionality accessible by the access request module 112 of the mobile device 102. The access verification module 120 may receive, process, and/or respond to account access and/or account utilization requests from the access request module 112 of a mobile device 102, for example, the request may be for an account balance associated with an account associated with a particular financial account processor 108. In an example embodiment of the invention, the gateway 104 may also receive, processes, and/or respond to messages received from the account module 132 of a financial account processor 108. In an example embodiment of the invention, the access verification module 144 may include a back-end analytic, editing, messaging, and reporting system for transactions between mobile devices 102 and financial account processors 108.

In an example embodiment of the invention, the access verification module 120 processes, authenticates, translates and/or routes various messages received from the mobile device 102 and/or the financial account processors 108 as they pass through the gateway 104. In an example embodiment of the invention, the access verification module 120 may include a business rules engine that is in communication with the database 126, where the database 126 may contain data for authentication processing such as MUIDs, encryption and/or decryption rules for processing the CUIDs and M-PINs received to identify the MUIDs to authenticate a message received from the mobile device 102. The database 126 may include other data and/or rules for processing messages include various transaction formats associated with a particular financial account processor used to translate the message received from the mobile device 102 to provide the data contained in the message in a format acceptable to the financial account processor 108.

In an example embodiment the translation process performed at the gateway 104 may take a generic hypertext markup language (HTML) based message received from a mobile device, such as mobile device 102, and translate the data contained in that message to a format and/or protocol acceptable to the financial account processor 108 to which the message is intended to be delivered. For example, when a message must be translated into a format acceptable to a particular financial account processor 108, the translation process may apply business rules to translate the received HTML message into a format for an automatic teller machine (ATM) transaction such that the financial account processor 108 operates in response to the message data as if the transaction was received from an ATM. Another translation may include taking the data contained in the received HTML message and placing it in the format of a point of sale/service (POS) terminal and/or kiosk such that the financial account processor 108 operates in response to the message data as if the transaction was received from a POS terminal or kiosk.

The access verification module 120 may issue denial messages to the mobile device 102 when an authentication of the message is unsuccessful (e.g., an MUID is associated with the provided CUID and M-PIN is not located, a CUID or M-PIN is not located in the received message from the mobile device 102, etc.). If the message from the mobile device 102 is authenticated then the message is routed from the gateway 104 to the financial account processor 108 associated with the authenticated message. In one example embodiment of the invention, the message may undergo some translation and/or reformatting at the gateway 104 prior to being sent to the financial account processor 108 to ensure the data sent to the financial account processor 108 is acceptable to that financial account processor 108. The financial account processor 108 may send a response message back to the gateway 104. The response message (e.g., user interface presentation, inquiries, confirmation message, etc.) may be sent to the mobile device 102, or may be reformatting and/or translated to a format acceptable to the mobile device and then transmitted to the mobile device 102. The access verification module 120 functionality provided by the gateway 104 is discussed in further detail below with reference to FIGS. 2-4.

It will be appreciated that FIG. 1 has been provided for illustrative purposes only, and that other variations are available in accordance with example embodiments of the invention. For example, the gateway 104 may be comprised of two or more distinct gateways that are in communication with each other. Although not illustrated in FIG. 1, in an example embodiment of the invention, one gateway 104 may be operative with one set of mobile devices 102, and/or financial account processors 108 while another gateway 104 may be operative with another set of mobile devices 102, and/or financial account processors 108. However, each gateway 104 may have a data processing arrangement with the other gateway(s) 104. Under a data processing agreement, one gateway 104 may have direct access to one or more services, including those provided by the modules of another gateway 104, or the gateway 104 may have direct access to third party systems accessible through another gateway 104 (e.g., mobile devices 102, and/or financial account processors 108, etc.).

Under such an arrangement, a gateway 104 may also be permitted to obtain services from such entities via the other gateway(s) 104.

The gateway 104 may connect to the financial account processors 108 through a variety of methods, including dial-up, frame relay or leased-line. In the example embodiment of FIG. 1, the gateway 104 and financial account processors 108 may be in communication with each other via connection 128. Connection 128 may comprise one or more networks that may include any telecommunication and/or data network, whether public, private, or a combination thereof, including a public switched telephone network (PSTN), a cellular network, a local area network, a wide area network, an intranet, an internet, the Internet, intermediate hand-held data transfer devices, and/or any combination thereof and may be wired and/or wireless. Connection 128 may also allow for real-time, off-line, and/or batch transactions to be transmitted between or among the gateway 104 and financial account processors 108. In an example embodiment of the invention, the connection 128 may be the same network as carrier network 106 or in communication with carrier network 106. Due to network connectivity, various methodologies as described herein may be practiced in the context of distributed computing environments.

The financial account processors 108 receive authenticated requests for account information and/or services via the gateway 104. In an example embodiment of the invention, a financial account processor 108 may be a specific processing platform for the account such as a prepaid, postpaid, debit, credit, DEA, loyalty, and/or private label processing platforms. In another example embodiment of the invention, the financial account processors 108 include private credit card, merchant, or bank systems. Examples of suitable financial account processors 108 may include STAR™ and ValueLink™. A financial account processor 108 may include at least one processor 134, a memory 130, and one or more input/output ("I/O") interface(s) 136. The memory 130 may store data files, business rules, and various software program modules, such as an account module 132 for processing any number of transactions initiated by a mobile device 102 requesting access to a financial account associated with a financial account processor 108 and authenticated and/or translated by the gateway 104. In an example embodiment of the invention, the memory 130 may also include an operating system ("OS"), such as, but not limited to, Microsoft Windows®, Apple OSX™, Unix, or Linux, and a database management system ("DBMS") to facilitate management of data files and data stored in the memory 130. The account module 132 may receive, process, and respond to an authenticated message from the gateway 104, for example, a message requesting an account balance of an account associated with that particular financial account processor 108. The account module 132 may process the authenticated message to respond with the appropriate information, for example, based on the application of stored business rules, as well as provide that information in the appropriate format for a particular user interface presentation to be displayed on the mobile device 102. The account module 132 functionality provided by the financial account processor 108 is discussed in further detail below with reference to FIGS. 2 and 4.

The account module 132 may additionally operate in conjunction with one or more of the I/O interfaces 136 to facilitate communication with one or more other components of the system 100, such as, the gateway 104, mobile devices 102, other financial account processors 108, and/or with one or more third party data sources. The I/O interfaces 136 may also facilitate communication with the financial account processor 108 and may include, for example, a display, keyboard, keypad, mouse, control panel, touch screen display, microphone, and the like, that facilitate user interaction with the financial account processor 108. The I/O interfaces 136 may also facilitate connection of the financial account processor 108 to one or more suitable networks such as the connection 128, a local area network, a wide area network, the Internet, an intranet, a telephone network, a cellular network, and the like. Additionally, other components may be included in the financial account processor 108 as desired in various embodiments of the invention. In another embodiment of the invention, one or more of the components of the financial account processors 108 may be incorporated into the gateway 104 and in those other embodiments, at least a portion of the functionality described herein with reference to the financial account processors 108 may be provided by the gateway 104.

The system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Figure 2:
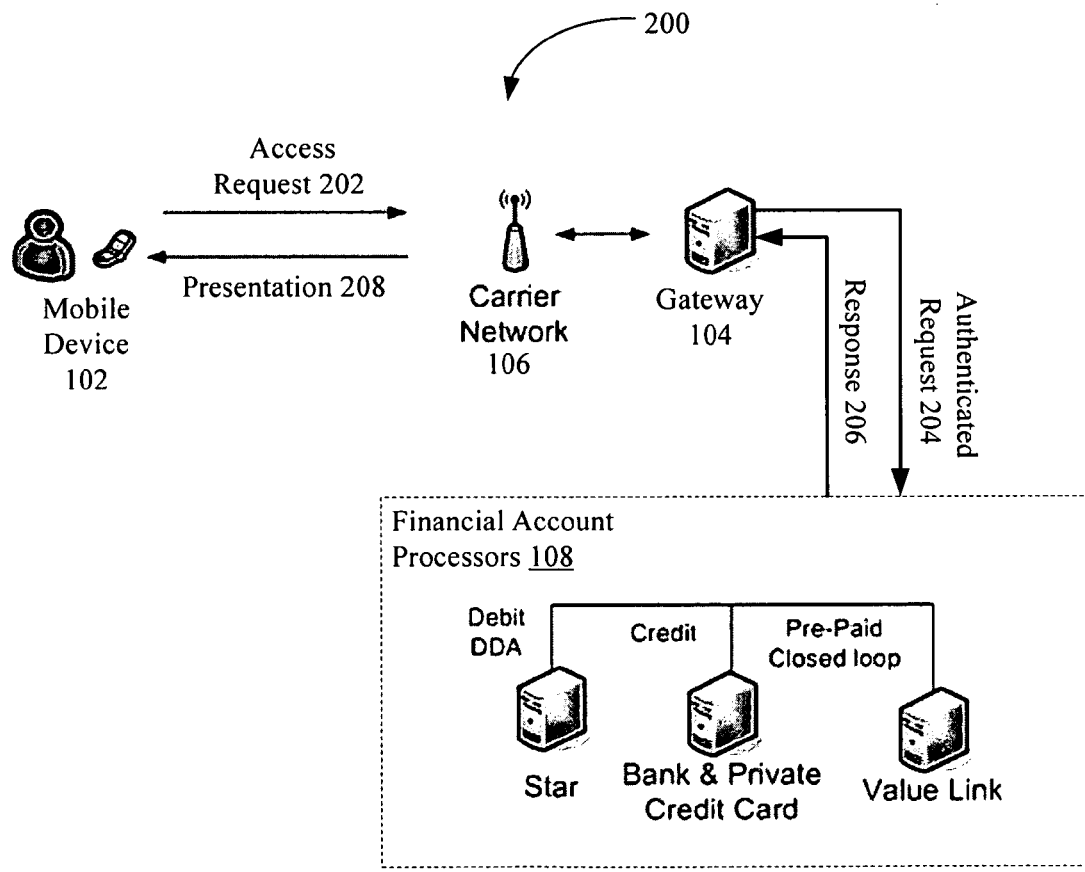
FIG. 2 shows an example data flow between the mobile device and financial account processors via the gateway in accordance with one embodiment of the invention.

FIG. 2 shows an example data flow 200 between the mobile device 102 and financial account processors 108 via the gateway 104 in accordance with one embodiment of the invention. As shown in FIG. 2, when the user of the mobile device 102 wants to access an enrolled financial account from the mobile device 102, the mobile device 102 transmits an access request 202 over the carrier network 106 to be received by the gateway 104. In an example embodiment of the invention, the access request 202 may include the CUID associated with the mobile device as well as the M-PIN provided by the user of the mobile device. The access request 202 may also include other authentication information and/or instructions/requests for the financial account processor 108 to process such as requests to make a payment using the account, check an account balance, transaction history associated with the account, balance transfers between accounts of the same and/or different institutions, and the like. In another embodiment of the invention, the access request 202 may also include an identifier of a specific financial account processor 108 to be accessed. Next, the access verification module of the gateway 104 processes the access request 202 to authenticate the user of the mobile device 102 and sends an authenticated request 204 to the determined (or identified) financial account processor 108.

Once the authenticated request 204 is received by at least one of the financial account processors 108 from the gateway 104, a response 206 may be generated by the at least one financial account processor 108 for transmission back to the gateway 104 and ultimately to the mobile phone 102. In the example embodiment of the invention shown in FIG. 2, the response 206 may include or otherwise facilitate an interface presentation that is customized for that particular financial account processor 108 to display or otherwise output on the mobile device 102 as presentation 208.

In another example embodiment of the invention, the response 206 may include or otherwise facilitate a user interface presentation 208 that includes one or more inquiries (e.g., security challenge questions) to be displayed or otherwise output on the mobile device 102. The user of the mobile device 102 may view those inquiries and transmit answers to the inquiries and/or requested information specified in the inquiries back to the financial account processor 108 for analysis and/or verification. These inquiries may be specific to a particular financial account processor 108 and provide additional authentication of the user prior to allowing access to, or action to be taken on, a particular financial account with the financial account processor 108. In another embodiment, the gateway 104 may access user interfaces, presentations, inquiries and other data for a specific financial account processor 108 to present or otherwise output at the mobile device 102 without having to request that information from the financial account processor 108. In an example embodiment of the invention, the types of inquiries transmitted to the mobile device 102 may vary depending on the financial account processor 108 associated with the access request 202 submitted by the mobile device 102. The inquiries used may also vary based on the source used for generating the inquiry (e.g., a user's stored identification and/or financial information at a financial account system 108, public records databases, etc.).

In other embodiments of the invention, one or more transmissions of an access request 202, authenticated request 204, response 206, or presentation 208 may bypass the gateway 104 when communicating with the intended entity (e.g., mobile device 102, financial account processor 108, or other third party entity). For example, in one embodiment of the invention, the gateway 104 may send the authenticated request 204 to a financial account processor 108 and the financial account processor 108 may process the authenticated request 204 and transmit a response 206 directly to the mobile device 102 either in addition to routing the response 206 to the gateway 104, or alternatively, bypassing the gateway 104 as a result. In another example embodiment of the invention, the request 202 may be sent from the mobile device 102 directly to a financial account processor 108 either in addition to routing the request 202 to the gateway 104, or alternatively, bypassing the gateway 104 as a result. A more detailed discussion of the access and/or use of various financial accounts by a mobile device 102 through a gateway 104 is described below with reference to FIGS. 3 and 4.

Figure 3:
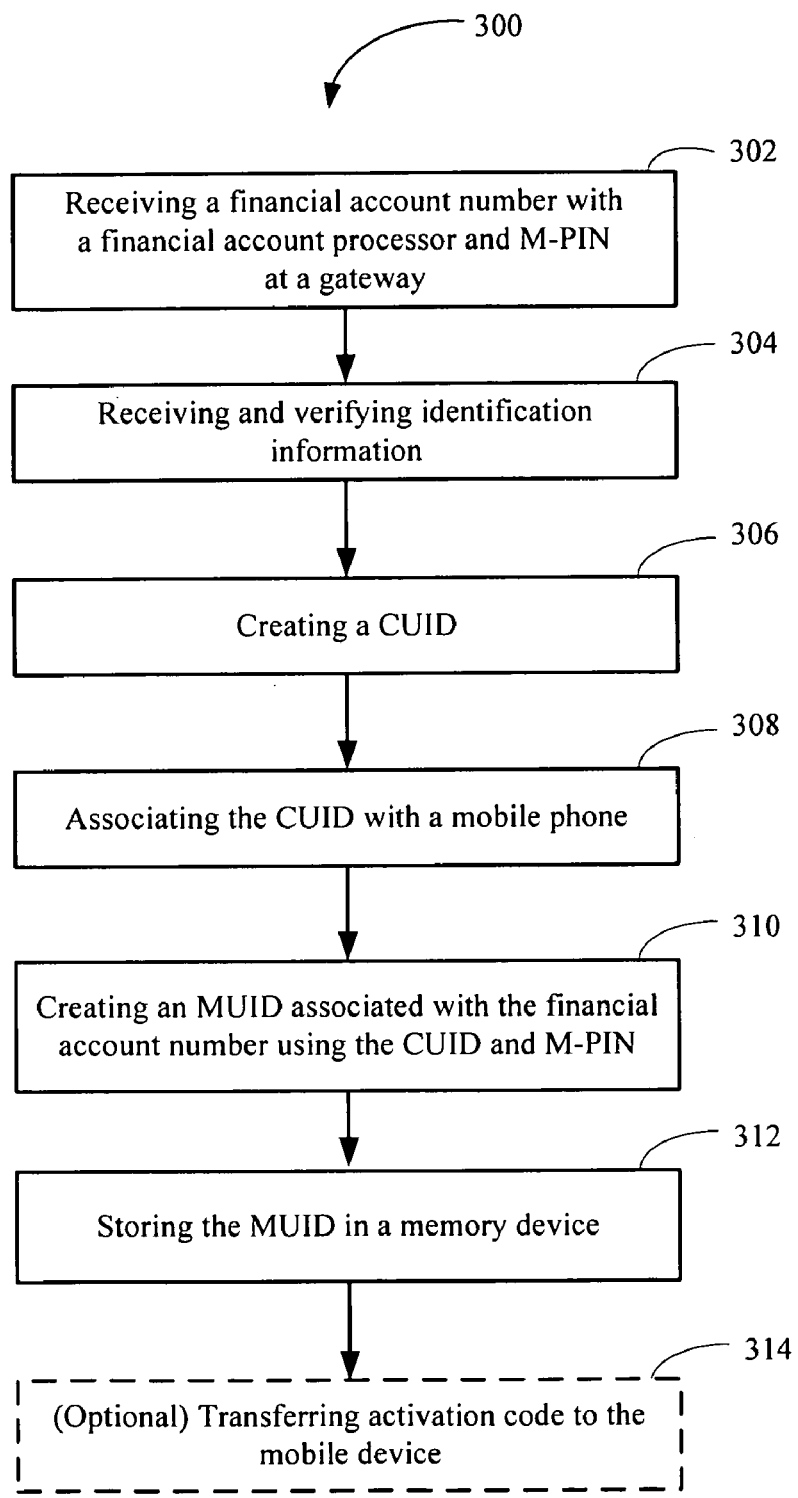
FIG. 3 shows an example flowchart of enrolling one or more mobile devices with the gateway in accordance with an embodiment of the invention.

FIG. 3 shows an example flowchart of enrolling one or more mobile devices with the gateway in accordance with an embodiment of the invention. As shown in FIG. 3, a process 300 of enrolling one or more mobile devices with the gateway begins at block 302, where a gateway prompts a user to submit a financial account number with a financial account processor along with an M-PIN, and the gateway receives the financial account number with a financial account processor and M-PIN to be associated with the financial account number and/or financial account processor. In example embodiments of the invention, the user may provide the financial account number and M-PIN through a mobile device or any other device with access to the Internet via a web browser (e.g., personal computer, point of service terminal, and the like). In another embodiment of the invention, an M-PIN may be assigned by the gateway.

In addition to receiving the financial account number with a financial account processor and an M-PIN at the gateway, block 304 is invoked where the user provides identification information to the gateway. The provided identification information may be verified to ensure the user is truly associated with the financial account number with a financial account processor. In example embodiments of the invention, the identification information associated with the user may be personal information of the user (e.g., address, names of family members, financial information, personal history information, etc.), or may be information that the gateway may independently verify that such information identifies or is otherwise associated with the user.

Next, block 306 is invoked where the gateway creates a CUID, and block 308 is invoked to associate the CUID with a particular mobile device of the user. In an example embodiment of the invention, a user may provide identifying information of the mobile device (e.g., telephone number, model number, manufacturer, current carrier, etc.) to the gateway to associate a particular CUID with the mobile device. The type of CUID provided to the mobile device may vary depending on the type of mobile device and/or the mode of operation it uses for submitting account access requests. For example, web-based mobile devices submitting account requests through a web browser may receive CUIDs as at least a portion of a session cookie, while mobile devices using midlets or applets for account access requests may store CUIDs as at least a portion of a midlet or applet. In additional example embodiments of the invention, mobile devices such as Google Android™ based mobile devices may have their CUIDs stored in a database. WAP-enabled mobile devices may have the CUID stored in a server side WAP session component. Other types of CUIDs and storage locations for those CUIDs may be used depending on the applications and/or protocols utilized by a particular mobile device in accordance with embodiments of the invention.

After a CUID has been created, block 310 is invoked to use the CUID and M-PIN to create an MUID that is associated with the financial account number of a financial account processor in such a way so as the financial account processor and/or financial account number may be identified by the MUID. In an example embodiment of the invention, an algorithm (or algorithms) utilizing the CUID and M-PIN may be used to create the MUID. In the embodiment of the invention described in FIG. 3, block 312 is invoked and the MUID is then stored in a memory device accessible by the gateway.

Also shown in the embodiment of FIG. 3 is block 314 where the gateway may generate an activation code for transmission to a mobile device. In an example embodiment of the invention, the activation code may be generated and sent to the mobile device when the user completes the enrollment process without using the mobile device. The activation code associates the enrollment information with the mobile device so that when the mobile device submits the activation code to the gateway, the gateway will then generate and send the CUID to the mobile device and/or confirm the association of the CUID with that particular mobile device, prompt the user for an M-PIN submission and then generate the MUID to be associated with the account. In another example embodiment of the invention, the activation code may be transmitted to the gateway from a device other than the mobile device and the mobile device may be associated with the CUID by providing identifying information of the mobile device such as a phone number, subscriber identity module (SIM) card information, carrier information, make/model information, and the like.

In an example embodiment of the invention, the activation codes may be used to pre-enroll customers and offer the activation code as a way to activate account services with a mobile phone. For example, an activation code may be part of a mailing, email, or short message service (SMS) text messaging offer to an account holder, or an activation code may be offered to an account holder during an online or offline sale and/or banking transaction where the account is used. Once that association has been made and the CUID has been stored at the mobile device, then the mobile device may be able to access the financial account number and/or financial account processor through the gateway by transmitting the CUID and M-PIN to the gateway to allow the gateway to identify the MUID associated with the financial account number and/or financial account processor. This process is discussed in further detail below with reference to FIG. 4.

Figure 4:
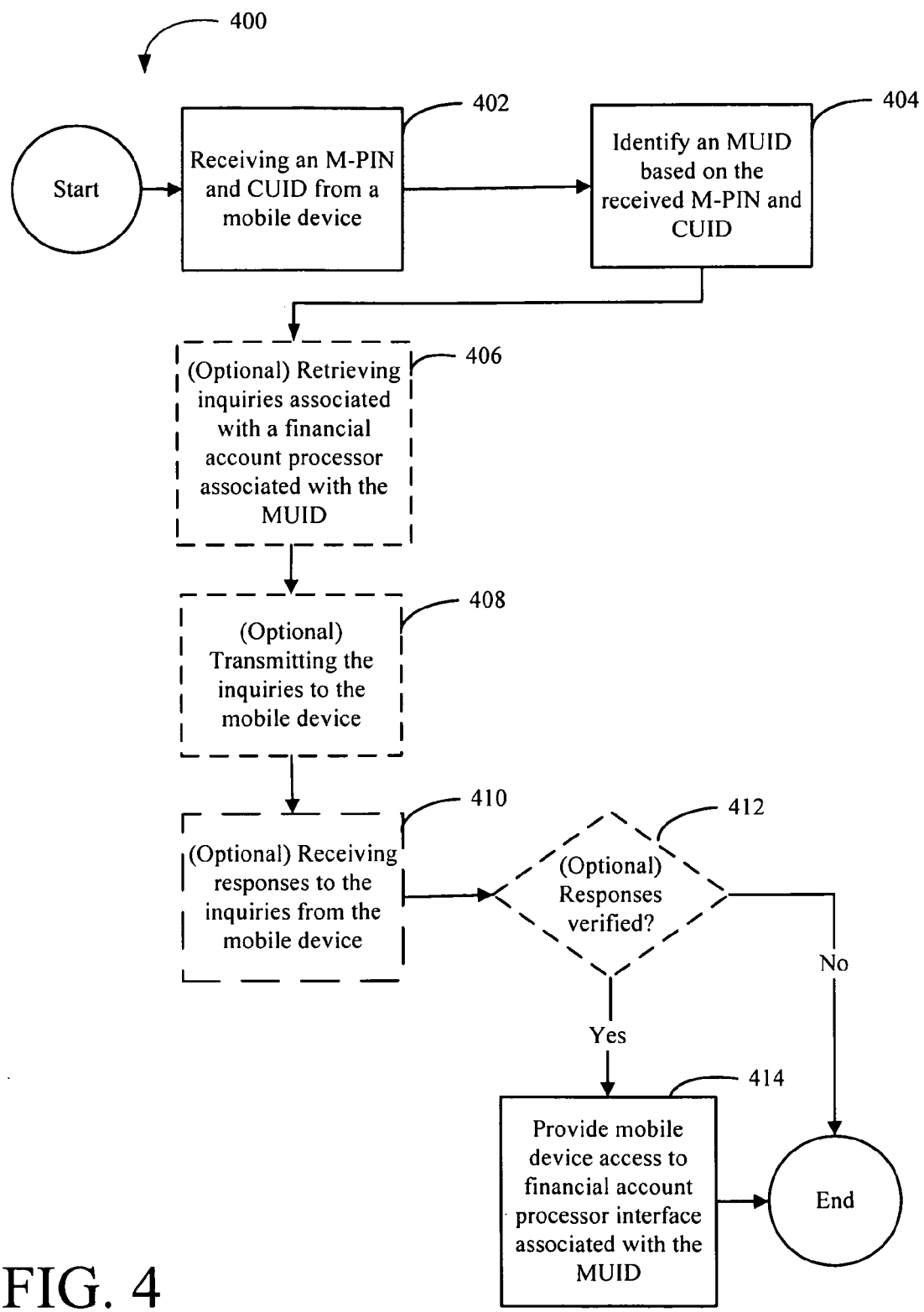
FIG. 4 shows an example flowchart of providing secure access to one of multiple financial account processors to a mobile device in accordance with an embodiment of the invention.

FIG. 4 shows an example flowchart of providing secure access to one of multiple financial account processors to a mobile device in accordance with an embodiment of the invention. As shown in FIG. 4, a process 400 of providing secure access to one of multiple financial account processors to a mobile device begins at block 402 where a gateway receives an M-PIN and CUID that were transmitted by a mobile device. Next, block 404 is invoked where the received M-PIN and CUID are used to identify at least one MUID. In example embodiments of the invention, various algorithms may be applied to the M-PIN and CUID to produce the MUID(s), or alternatively, identify the location of where the MUID(s) can be found.

In one example embodiment of the invention, once the MUID has been identified, block 414 may be invoked where the account of a particular financial processor associated with the MUID may be identified using the MUID and where the mobile device is provided access to an interface associated with that particular financial account processor. In other embodiments of the invention, additional security measure may be taken before providing the requesting mobile device access to an interface associated with that particular financial account processor. An example of those additional security measures is described below with reference to blocks 406-412 of FIG. 4.

As shown in the embodiment of FIG. 4, after the MUID has been identified in block 404, block 406 may be invoked where one or more inquiries associated with the financial account processor identified by the MUID are retrieved for transmission to the mobile device in block 408. In example embodiments of the invention, the inquiries may be directed at personal information of the user (e.g., address, names of family members, financial information, personal history information, etc.). The inquiries may also include questions that the user may have previously provided an answer during the enrollment process described above with reference to FIG. 3 (e.g., name of pet, high school mascot, or other information previously provided by the user). Once the inquiries have been transmitted to the mobile device, the mobile device user may respond to the inquiries and the responses may be received from the mobile device in block 410.

Next, block 412 may be invoked to verify the responses to the inquiries. For example, if the inquiry asked the user for the answer to a question, then the response would be reviewed to determine if it matches a correct answer associated with the question and stored in a database. In one example embodiment of the invention, if more than one inquiry was sent, then the responses may all be verified and an overall score may be assigned to the responses depending on the determined accuracy of the responses to the questions. If the responses are not sufficiently verified, then the process is aborted and the mobile device is not provided access to the financial account processor. If the responses are sufficiently verified, then block 414 is invoked to provide mobile device access to the financial account processor interface associated with the MUID.

Figure 5:
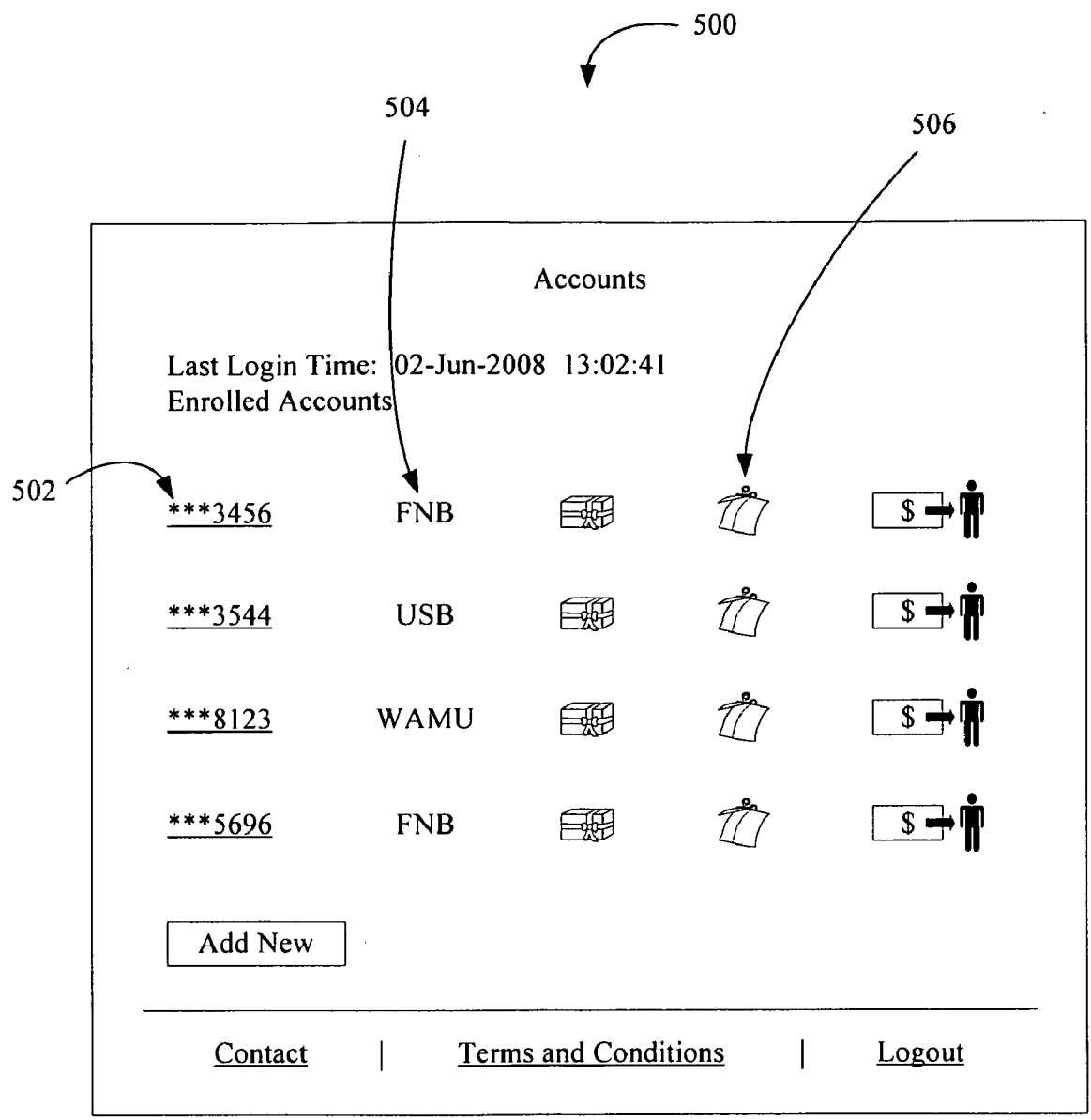
FIG. 5 shows an example mobile device user interface provided by a financial account processor via the gateway in accordance with an embodiment of the invention.

FIG. 5 shows an example mobile device user interface 500 provided by a financial account processor via the gateway in accordance with an example embodiment of the invention. As shown in FIG. 5, the mobile device user interface 500 shows a list of all accounts 502 enrolled with the gateway. In the example embodiment of FIG. 5, the actual account numbers are not listed, rather only the last for digits of the account are shown. The mobile device user interface 500 also shows an indication 504 of the financial service processor associated with each account. In the example embodiment of FIG. 5, additional icons 506 are presented representing various types of transactions available to or otherwise associated with the account. These icons may represent various actions related to the account that a mobile device user may request such as payments, payment history, status inquiries, transfers, balance inquiries, etc. In other embodiments of the invention, other transactions and/or account identifiers may be implemented on a mobile device user interface, such as mobile device user interface 500.

Certain embodiments of the invention are described above with reference to block diagrams and flowchart illustrations of systems, methods, apparatuses and computer program products. It will be understood that each block of the block diagrams and flowchart illustrations, and combinations of blocks in the block diagrams and flowchart illustrations, respectively, can be implemented manually and/or by computer program instructions. With respect to computer program instructions, they may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational elements or steps to be performed on the computer or other programmable apparatus to produce a computer-implemented process such that the instructions that execute on the computer or other programmable apparatus provide elements or steps for implementing one or more functions specified in the flowchart block or blocks.

Accordingly, blocks of the block diagrams and flowchart illustrations may support combinations of means for performing the specified functions, combinations of elements or steps for performing the specified functions, and program instruction means for performing the specified functions. It will also be understood that each block of the block diagrams and flowchart illustrations, and combinations of blocks in the block diagrams and flowchart illustrations, can be implemented manually or by special purpose hardware-based computer systems that perform the specified functions, elements or steps, or combinations of special purpose hardware and computer instructions.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

The invention claimed is:

1. A method comprising:
   receiving, from a mobile device, a mobile personal identification number (M-PIN) and Customer Unique Identifier (CUID) associated with the mobile device;
   processing, at a gateway, the received M-PIN and CUID to identify a Mobile Unique Identifier (MUID), wherein the MUID is based at least in part on the CUID and PIN, and the MUID identifies an account of at least one financial account processor; and
   providing, at a gateway, the mobile device with access to the account of the at least one financial account processor.

2. The method of claim 1, further comprising:
   prior to providing the mobile device with access to the account:
   determining a set of inquiries associated with the at least one financial account processor;
   transmitting the set of inquiries to the mobile device;
   receiving response information from the mobile device to answer the set of inquiries; and
   verifying the response information, wherein providing the mobile device with access to the at least one financial account processor occurs only after the response information is verified.

3. The method of claim 1, further comprising:
   prior to receiving the M-PIN and the CUID associated with the mobile device, receiving enrollment information, wherein the enrollment information includes a financial account number associated with at least one financial account processor accessible through a gateway processor and the M-PIN associated with the financial account number;
   assigning the CUID to a mobile device associated with the M-PIN;
   creating the MUID based at least in part on the CUID and PIN, wherein the MUID is associated with the enrollment information; and
   storing the MUID.

4. The method of claim 3, further comprising:
   transmitting the CUID to the mobile device.

5. The method of claim 3, further comprising:
   assigning an activation code to the CUID; and
   transmitting the activation code to the mobile device.

6. The method of claim 5, wherein transmitting the activation code to the mobile device comprises transmitting the activation code to the mobile device via short message service (SMS) text messaging.

7. The method of claim 1, wherein processing the received M-PIN and CUID to identify the MUID includes identifying a plurality of MUIDs associated with the mobile device;
   wherein receiving the M-PIN and the CUID includes receiving, from the mobile device, an indicator associated with at least one financial account processor associated with one of the plurality of MUIDs; and
   wherein providing the mobile device with access to the at least one financial account processor includes providing the mobile device with access to the at least one financial account processor associated with the indicator.

8. The method of claim 1, wherein the at least one financial account processor is a debit DDA processor, credit card processor, or pre-paid processor.

9. The method of claim 1, further comprising:
   receiving, from the mobile device, request data;
   translating the request data into a format acceptable to the at least one financial account processor; and
   transmitting the translated request data to the at least one financial account processor.

10. The method of claim 9, wherein the request data includes a payment instruction.

11. A system comprising:
    a memory for storing computer-executable instructions; and a processor in communication with the memory, wherein the processor is configured to execute the computer-executable instructions to:
- receive, from a mobile device, a mobile personal identification number (M-PIN) and Customer Unique Identifier (CUID) associated with the mobile device,
- process the received M-PIN and CUID to identify a Mobile Unique Identifier (MUID), wherein the MUID is based at least in part on the CUID and PIN, and the MUID identifies an account of at least one financial account processor, and
- provide the mobile device with access to the account of the at least one financial account processor.

12. The system of claim 11, wherein, prior to providing the mobile device with access to the account based on the review of the response information, the processor is further configured to execute the computer-executable instructions to:
- determine a set of inquiries associated with the at least one financial account processor,
- transmit the set of inquiries to the mobile device,
- receive response information from the mobile device to answer the set of inquires, and
- verify the response information, wherein providing the mobile device with access to the at least one financial account processor occurs only after the response information is verified.

13. The system of claim 11, wherein the processor is further configured to execute the computer-executable instructions to:
- prior to receiving the M-PIN and the CUID associated with the mobile device, receive enrollment information, wherein the enrollment information includes a financial account number associated with the at least one financial account processor accessible through a gateway processor and the M-PIN associated with the financial account number,
- assign a CUID to a mobile device associated with the M-PIN,
- create a MUID from the CUID and M-PIN, wherein the MUID is associated with the enrollment information, and
- store the MUID in the memory.

14. The system of claim 13, wherein the processor is further configured to execute the computer-executable instructions to transmit the CUID to the mobile device.

15. The system of claim 13, wherein the processor is further configured to execute the computer-executable instructions to:
- assign an activation code to the CUID; and
- transmit the activation code to the mobile device.

16. The system of claim 15, wherein the computer-executable instructions to transmit the activation code to the mobile device include transmitting the activation code to the mobile device via short message service (SMS) text messaging.

17. The system of claim 11, wherein the computer-executable instructions to process the received M-PIN and CUID to identify a MUID include identifying a plurality of MUIDs associated with the mobile device,
- wherein the computer-executable instructions to receive the M-PIN and the CUID include receiving, from the mobile device, an indicator associated with at least one financial account processor associated with one of the plurality of MUIDs, and
- wherein the computer-executable instructions to provide the mobile device with access to the at least one financial account processor include providing the mobile device with access to the at least one financial account processor associated with the indicator.

18. The system of claim 11, wherein the at least one financial account processor is a debit DDA processor, credit card processor, or pre-paid processor.

19. The system of claim 11, wherein the processor is further configured to execute the computer-executable instructions to:
- receive, from the mobile device, request data,
- translate the request data into a format acceptable to the at least one financial account processor, and
- transmit the translated request data to the at least one financial account processor.

20. The system of claim 19, wherein the request data includes a payment instruction.

* * * * *